(12) United States Patent
Sasakura et al.

(10) Patent No.: US 7,604,567 B2
(45) Date of Patent: Oct. 20, 2009

(54) CONTROL APPARATUS OF VEHICLE

(75) Inventors: Takashi Sasakura, Toyota (JP); Takao Kimura, Aichi (JP); Junji Takekoshi, Okazaki (JP); Yukari Takahashi, Anjo (JP); Kunishige Hayashi, Okazaki (JP); Ryo Ogasawara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/051,609

(22) Filed: Mar. 19, 2008

(65) Prior Publication Data

US 2009/0088292 A1 Apr. 2, 2009

(30) Foreign Application Priority Data

Sep. 28, 2007 (JP) ............................. P2007-254348

(51) Int. Cl.
*B60W 10/00* (2006.01)
*F16H 59/60* (2006.01)
*F16H 59/62* (2006.01)
*G06F 7/00* (2006.01)
*G06F 17/00* (2006.01)

(52) U.S. Cl. ............................. 477/97; 477/70; 477/76; 701/66

(58) Field of Classification Search ................... 477/97, 477/70, 76, 101, 174; 701/65–67
See application file for complete search history.

(56) References Cited

U.S. PATENT DOCUMENTS

| 6,145,398 | A * | 11/2000 | Bansbach et al. | 74/335 |
| 7,287,443 | B2 * | 10/2007 | Kuhstrebe et al. | 74/335 |
| 7,392,721 | B2 * | 7/2008 | Pollak et al. | 74/330 |

FOREIGN PATENT DOCUMENTS

| JP | 04-262166 | 9/1992 |
| JP | 11-063204 | 3/1999 |
| JP | 2006-52832 A | 2/2006 |

* cited by examiner

*Primary Examiner*—Tisha D Lewis
(74) *Attorney, Agent, or Firm*—Birch, Stewart, Kolasch & Birch, LLP

(57) ABSTRACT

A control apparatus of a vehicle includes: an internal combustion engine; a transmission, including a group of gears made to mesh with synchronizing mechanisms for attaining a predetermined change of gear; an internal combustion engine controller stopping the internal combustion engine when receiving a first control stop signal; a transmission controller, controlling the synchronizing mechanisms via an actuator actuated by a power source driven by the internal combustion engine, when a shift lever is in a drive force cut-off position, the transmission controller releasing the meshing of the synchronizing mechanism when receiving a second control stop signal; and a control stop signal controller, transmitting the second control stop signal to the transmission controller when detecting that an ignition switch of the vehicle is switched off, and transmitting the first control stop signal to the internal combustion engine controller after the transmission controller has released the meshing of the synchronizing mechanism.

3 Claims, 3 Drawing Sheets

CONTROL APPARATUS OF VEHICLE

BACKGROUND OF THE INVENTION

1. Field of the Invention

The present invention relates to a control apparatus of a vehicle and more particularly to a control apparatus of a vehicle which includes a so-called dual-clutch type transmission which has clutches and change-speed gear clusters for two systems. In addition, the invention relates specifically to a control when an engine is stopped.

2. Description of the Related Art

As a vehicle's transmission of the related art, there is known a mechanical automatic transmission or a so-called dual-clutch type transmission which includes clutches and change-speed gear clusters for two systems without using a torque converter.

For example, in the dual-clutch type transmission, odd-numbered change-speed gears such as first, third and fifth gears are coupled to one clutch, while even-numbered change-speed gears such as second, fourth and sixth gears are coupled to the other clutch (refer to JP-A-2006-52832).

Synchronizing mechanisms for selecting respective change-speed gears are provided for each system, and a change-speed gear is determined by the synchronizing mechanism, and by applying and releasing alternately the two clutches, the change of gear is effected.

Specifically, while the one clutch is applied, the synchronizing mechanism is caused to mesh with the next change-speed gear to be attained for preparation in the other system, and when a change of gear is effected, the one clutch is released, whereas the other clutch is applied to effect the change of gear.

In a dual-clutch type transmission like that disclosed JP-A-2006-52832, by keeping both the two clutches in the disengaged state, a drive force cut-off state can be produced in which the transmission of drive force from an internal combustion engine (hereinafter, referred to as an engine) to drive road wheels is cut off.

In this way, there may be a case where so-called normally open clutches which can maintain the disengaged state even when the engine is stopped and a power source becomes off are used on a vehicle on which a transmission is equipped in which the drive force transmission is cut off by the clutches being disengaged.

In the vehicle like this, when an ignition switch is switched off, the vehicle can be stopped with the drive force cut off even though the synchronizing mechanism is left meshing with the change-speed gear. In addition, since the clutches are normally open, there is provided an advantage that when the engine is stopped, no electric load is applied.

In addition, where the dual-clutch type transmission is equipped on a vehicle in which a drive force cut-off position where the transmission of drive force from an internal combustion engine to drive road wheels is cut off (for example, a gear shift position such as neutral (N) or park (P)) and a running position where the drive force from the internal combustion engine is transmitted to the drive road wheels (for example, a gear shift position such as drive (D) or reverse (R)) can be selected by a shift lever, there may occur a case where even when the drive force cut-off position is selected, the synchronizing mechanism is made to operate for meshing in an attempt to attain a predetermined change of gear in order to attain the predetermined change of gear quickly, and in the event that the ignition switch is switched off in such a state, the vehicle can be stopped with the synchronizing mechanism left meshing with the change-speed gear.

However, in such a state that the synchronizing mechanism is left meshing with the change-speed gear, an internal resistance of the transmission is large, and when the vehicle is started in such a state, in particular, in the case of the clutches being wet clutches, even though the clutches are released, the internal resistance of the transmission is transmitted as the load of the engine via oil within the clutches, causing a problem that the starting performance is deteriorated.

In particular, when the vehicle is in an extremely low temperature state, the shearing resistance of oil and mechanical resistance of the gears become large, load exerted on the engine when it is started becomes excessively large, leading to a fear that the engine is not started.

SUMMARY OF THE INVENTION

It is therefore an object of the invention to provide a control apparatus of a vehicle including a transmission having normally open clutches in which the internal resistance of the transmission is reduced when an engine is stopped, so as to enhance the startability of the engine next time the engine is started.

In order to achieve the object, according to the invention, there is provided a control apparatus of a vehicle, comprising:

an internal combustion engine, equipped on the vehicle;

a transmission, including a normally open wet clutch for transmitting or interrupting drive force from the internal combustion engine, and a group of gears which are made to mesh with synchronizing mechanisms for attaining a predetermined change of gear;

a shift lever, which can select through a manual operation thereof a drive force cut-off position where transmission of drive force from the internal combustion engine to drive road wheels is cut off;

an internal combustion engine controller, controlling the internal combustion engine, and stopping the internal combustion engine when receiving a first control stop signal;

a transmission controller, controlling the clutch and the synchronizing mechanisms via an actuator which is actuated by a power source driven by the internal combustion engine, when the shift lever is in the drive force cut-off position, the transmission controller disengaging the clutch and meshing the synchronizing mechanism with the group of gears to attain a predetermined change of gear, the transmission controller releasing the meshing of the synchronizing mechanism when receiving a second control stop signal; and a control stop signal controller, transmitting the second control stop signal to the transmission controller when detecting that an ignition switch of the vehicle is switched off, and transmitting the first control stop signal to the internal combustion engine controller after the transmission controller has released the meshing of the synchronizing mechanism.

BRIEF DESCRIPTION OF THE DRAWINGS

The invention will be described by reference to the following drawings, and like reference numerals will refer to like elements.

DETAILED DESCRIPTION OF THE INVENTION PREFERRED EMBODIMENTS

Hereinafter, an embodiment of the invention will be described based on the drawings.

Figure 1:
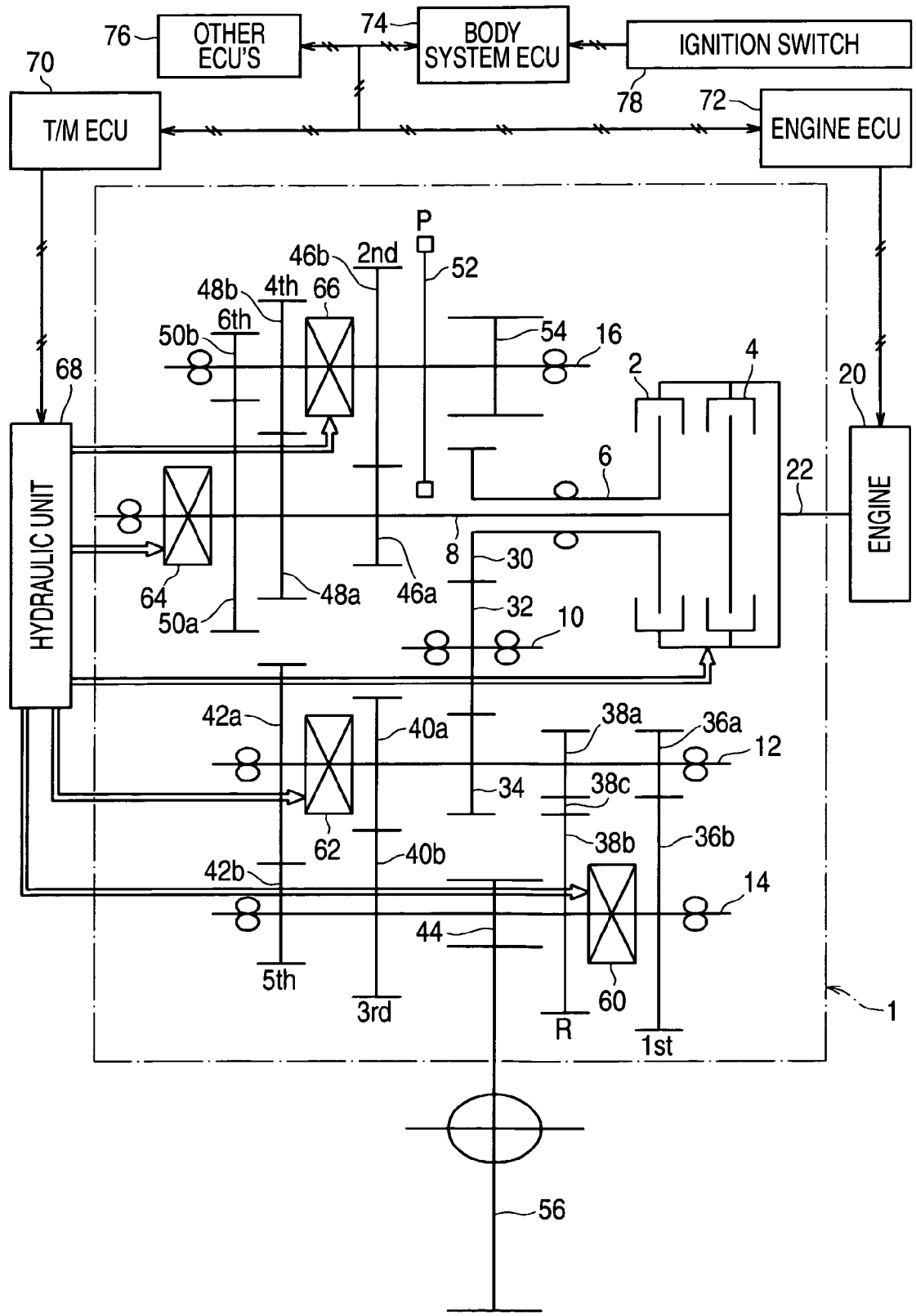
FIG. 1 is an exemplary diagram of a control apparatus of a vehicle according to the invention.

Referring to FIG. 1, an exemplary diagram is shown of a control apparatus of a vehicle according to the invention.

As is shown in FIG. 1, a transmission 1 equipped on a vehicle mainly includes a clutch 2 for odd-numbered change-speed gears and a clutch 4 for even-numbered change-speed gears, a clutch connecting shaft 6 for the odd-numbered change-speed gears and a main shaft 8 for the even-numbered change-speed gears, an intermediate shaft 10 for the odd-numbered change-speed gears, a main shaft 12 for the odd-numbered change-speed gears, a countershaft 14 for the odd-numbered change-speed gears and a countershaft 16 for the even-numbered change-speed gears. These shafts 6, 8, 10, 12, 14, 16 are arranged in such a manner that axes thereof are in parallel.

Specifically, the odd-numbered change-speed gears clutch 2 and the even-numbered change-speed gears clutch 4 are respectively wet clutches which are formed in such a manner as to be engaged with and disengaged from an output shaft 22 of an engine 20 (an internal combustion engine) through the supply of hydraulic pressures and are so-called normally open clutches which can maintain their disengaged state even when the engine 20 is stopped and a power source becomes off.

The odd-numbered change-speed gears clutch shaft 6 is rotatably fitted on an outer circumference of the even-numbered change-speed gears main shaft 8 and is coupled to the odd-numbered change-speed gears clutch 2 at one end and a coupling gear 30 is provided at the other end thereof. The coupling gear 30 is made to mesh with an intermediate gear 32 of the odd-numbered change-speed gears intermediate shaft 10, and the intermediate gear 32 is made to mesh with an odd-numbered change-speed gear input gear 34 of the odd-numbered change-speed gears main shaft 12, as well.

Respective change-speed drive gears such as a first drive gear ($1^{st}$) 36a, a reverse drive gear (R) 38a, a third drive gear ($3^{rd}$) 40a, and a fifth drive gear ($5^{th}$) 42a are provided on the odd-numbered change-speed gears main shaft 12 sequentially in that order from one side thereof. In addition, the odd-numbered change-speed gear input gear 34 is provided on the odd-numbered change-speed gears main shaft 12 in a position between the reverse drive gear 38a and the third drive gear 40a.

A first driven gear 36b, a reverse driven gear 38b, a third driven gear 40b, and a fifth driven gear 42b are provided on the odd-numbered change-speed gears countershaft 14 in such a manner as to correspond to the respective change-speed drive gears on the odd-numbered change-speed gears main shaft 12, and the respective change-speed drive gears on the odd-numbered change-speed gears main shaft 12 and the respective change-speed driven gears on the odd-numbered change-speed gears countershaft 14 are made to constantly mesh with each other. In addition, the reverse drive gear 38a and the reverse driven gear 38b are made to mesh with each other via a reverse intermediate gear 38c.

In addition, an odd-numbered change-speed output gear 44 is provided on the odd-numbered change-speed gears countershaft 14 in a position between the reverse driven gear 38b and the third driven gear 40b.

On the other hand, the even-numbered change-speed gears main shaft 8 is coupled to the even-numbered change-speed gears clutch 4 at one end, and respective change-speed gears such as a second driver gear ($2^{nd}$) 46a, a fourth drive gear ($4^{th}$) 48a, and a sixth drive gear ($6^{th}$) 50a are provided on the other side.

A second driven gear 46b, a fourth driven gear 48b and a sixth driven gear 50b are provided on the even-numbered change-speeds countershaft 16 in such a manner as to correspond to the respective change-speed drive gears on the even-numbered change-speed gears main shaft 8, and the respective change-speed gears of the even-numbered change-speed gears main shaft 8 and the respective change-speed driven gears of the even-numbered change-speed gears countershaft 16 are made to constantly mesh with each other.

In addition, on the even-numbered change-speed gears countershaft 16, a park gear (P) 52 and an even-numbered change-speed gear output gear 54 are provided on one side of the second driven gear 46b.

The even-numbered change-speed gear output gear 54 and the odd-numbered change-speed gear output gear 44 are made to mesh with a differential gear 56.

In addition, synchronizers 60, 62, 64, 66 are provided in respective positions such as between the first driven gear 36b and the reverse driven gear 38b on the odd-numbered change-speed gears countershaft 14, between the third drive gear 40a and the fifth drive gear 42a on the odd-numbered change-speed gears main shaft 12, at the other side of the sixth drive gear 50a on the even-numbered change-speed gears main shaft 8, and between the second driven gear 46b and the fourth driven gear 48b on the even-numbered change-speed gears countershaft 16.

The synchronizers 60, 62, 64, 66 mesh with the corresponding change-speed drive gears and change-speed driven gears by the supply of hydraulic pressure to enable a power transmission between the change-speed drive gears and change-speed driven gears and their corresponding shafts. Specifically, the synchronizer 60 on the odd-numbered change-speed gears countershaft 14 can mesh with the first driven gear 36b and the reverse driven gear 38b, the synchronizer 62 on the odd-numbered change-speed gears main shaft 12 can mesh with the third drive gear 40a and the fifth drive gear 42a, the synchronizer 64 on the even-numbered change-speed gears main shaft 8 can mesh with the sixth drive gear 50a, and the synchronizer 66 on the even-numbered change-speed gears countershaft 16 can mesh with the second driven gear 46b and the fourth driven gear 48b.

Note that in the following description, the change-speed drive gears and the change-speed driven gears are generally referred to as change-speed gears. Hydraulic pressure is supplied from a hydraulic unit 68 (an actuator) to the synchronizers 60, 62, 64, 66, the odd-numbered change-speed gears clutch 2 and the even-numbered change-speed gears clutch 4.

The hydraulic unit 68 is supplied with hydraulic pressure from a hydraulic pump (a power source), not shown, which is driven by power from the engine 20.

In addition, a transmission ECU (hereinafter, referred to as a T/M ECU) 70 is equipped on the vehicle for controlling the synchronizers 60, 62, 64, 66, the odd-numbered change-speed gears clutch 2 and the even-numbered change-speed gears clutch 4 via the hydraulic unit 68. A shift lever, not shown, is provided within a passenger compartment which can select a gear shift position between a drive force cut-off position where the transmission of drive force from the internal combustion engine to drive road wheels is cut off (for example, a position such as neutral (N) or park (P)) and a running position where the drive force from the internal combustion engine is transmitted to the drive road wheels (for example, a gear shift position such as drive (D) or reverse (R)), and the T/M ECU 70 is such as to control the synchronizers 60, 62, 64, 66, the odd-numbered change-speed gears clutch 2 and the even-numbered change-speed gears clutch 4 in accordance with the gear shift position and the driving condition of the vehicle.

Furthermore, equipped on the vehicle are an engine ECU 72 for controlling the engine 20, a body system ECU 74 for controlling body system equipment of the vehicle such as doors, windows, wipers, lamps and the like and other ECU's 76 for performing controls corresponding to other devices of the vehicle.

The respective ECU's 70, 72, 74, 76 are electrically connected to each other by, for example, power source lines or CAN transmission lines.

In addition, electrically connected to the body system ECU 74 is an ignition switch 78 which is switched on and off in response to starting and stopping operations of the vehicle by, for example, an ignition key of the vehicle. Then, the body system ECU 74 has a function to detect switching on and off of the ignition switch 78 and transmit to the respective ECU's 70, 72, 76 a control operative signal for activating their controls and a control stop signal for stopping their controls.

Hereinafter, the function of the control apparatus of the vehicle according to the invention will be described which is configured as has been described above.

In a control over the gear change in the transmission 1 by the T/M ECU 70, when the gear shift position is in the drive (D), one of the odd-numbered change-speed gears clutch and the plurality of change-speed gears clutch is applied, and in the other system, the synchronizing mechanism is made to mesh with the next change-speed gear to be attained for preparation. Then, when a change of gear is effected, the clutches are switched over by releasing the one clutch and applying the other clutch to thereby attain the change-speed gear quickly.

For example, when accelerating the vehicle in the first gear, the odd-numbered change-speed gears clutch 2 is applied to be connected with the output shaft 22 of the engine 20 in such a state that the synchronizer 60 on the odd-numbered change-speed gears countershaft 14 is made to mesh with the first driven gear 36b. On the other hand, although the even-numbered change-speed gears clutch 4 is in such a state that it is released from the output shaft 22 of the engine 20, the synchronizer 66 on the even-numbered change-speed gears countershaft 16 is made to mesh with the second driven gear 46b which is the next change-speed gear to be attained.

Then, when shifting from the first gear to the second gear, the even-numbered change-speed gears clutch 4 is being applied, while releasing the odd-numbered change-speed gears clutch 2 from the output shaft 22 of the engine 20, and the change of gear to the second gear is completed by the odd-numbered change-speed gears clutch 2 being released completely and the even-numbered change-speed gears clutch 4 being applied completely. After the change of gear has been completed, while the synchronizer 60 on the odd-numbered change-speed gears main shaft 14 is released from the first driven gear 36b, the synchronizer 62 is made to mesh with the third drive gear 40a which is the next change-speed gear to be attained.

In the transmission 1 like this, in the respective systems of odd-numbered change-speed gears and even-numbered change-speed gears, either of the synchronizers 60, 62 and either of the synchronizers 64, 66 are made to constantly mesh with the change-speed gears.

In addition, when the gear shift position is in the park (P) or neutral (N), a drive force cut-off state in produced in which the transmission of drive force from the engine 20 is cut off by putting both the odd-numbered change-speed gears clutch 2 and the even-numbered change-speed gears clutch 4 in a released state. Consequently, as this occurs, either of the synchronizers 60, 62 and either of the synchronizers 64, 66 may be left meshing with the change-speed gears. For example, the drive force cut-off state can be produced in such a state that the synchronizers 60, 66, for example, are left meshing with the first driven gear 36b and the second drive gear 46b, respectively.

In addition, when receiving a control stop signal from the body system ECU 74, the T/M ECU 70 releases the meshing of all the synchronizers 60, 62, 64, 66 and thereafter ends the control of the transmission 1.

Here, when detecting that the ignition switch 78 has been switched off, the body system ECU 74 first transmits a control stop signal to the T/M ECU 70 and transmits a control stop signal to the engine ECU 72 and the other ECU's 76 after a predetermined delay time has elapsed since it transmitted the control stop signal to the T/M ECU 70.

Figure 2:
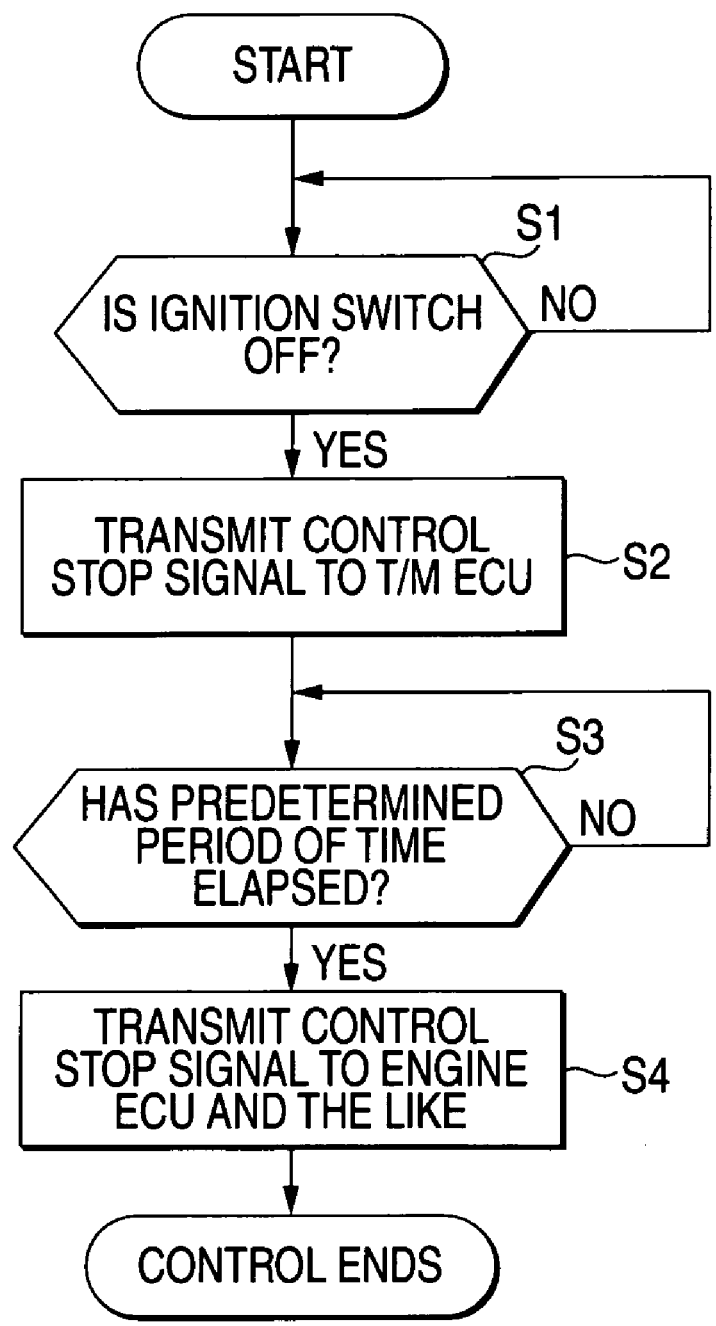
FIG. 2 is a flowchart showing an engine stop control routine executed by a body system ECU.

Specifically, FIG. 2 shows an engine stop control routine that is executed by the body system ECU 74 in the form of a flowchart, and the routine will be described based on the same flowchart.

As is shown in FIG. 2, at step S1, whether the ignition switch 78 has been switched from on to off is detected. If the result of the determination is false (No), that is, if the ignition switch 78 remains on, the determination in step S1 will be repeated. On the other hand, if the result of the determination is true (Yes), namely, if the ignition switch 78 has been switched from on to off, the flow proceeds to the following step, step 2.

At step S2, a control stop signal is transmitted to only the T/M ECU 70.

At the following step S3, whether or not a predetermined period of time (for example, several seconds), which is the predetermined delay time from the transmission of the control stop signal to the T/M ECU 70 at step S2 above, has been elapsed is determined. If the result of the determination is false (No), the step S3 will be repeated again. On the other hand, if the result of the determination is true (Yes), that is, if the predetermined period of time (for example, several seconds) has elapsed since the control stop signal was transmitted to the T/M ECU 70, the flow proceeds to step S4. Note that the predetermined delay time that is the predetermined period of time (for example, several seconds) is a period of time which is sufficient to release the meshing of the synchronizers 60, 62, 64, 66 even at an extremely low temperature (for example, −15°).

At step S4, a control stop signal is transmitted to the ECU's other than the T/M ECU 70, that is, the engine ECU 72 and the other ECU's 76.

Then, the control in the body system ECU 74 ends.

In this way, when the ignition switch 78 has been switched off, the body system ECU 74 first transmits the control stop signal to the T/M ECU 70 and thereafter transmits the control stop signal to the engine ECU 72 and the other ECU's 76 after the predetermined period of time (for example, several seconds) has elapsed.

More specifically, referring to FIG. 3, a time chart is shown which depicts states in which the engine is stopped in an extremely low temperature condition in a time series manner, and the states in which the engine is stopped will be described based on the same figure.

Figure 3:
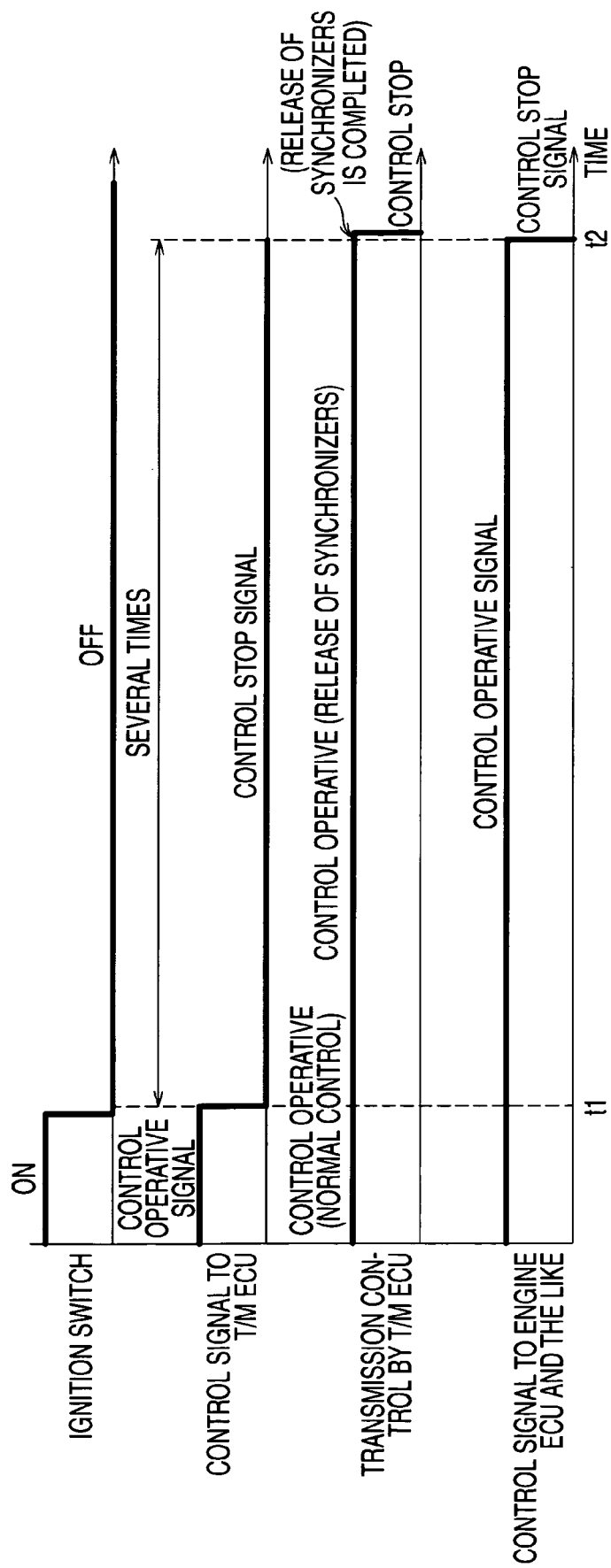
FIG. 3 is a time chart showing a state when an engine is stopped in a time series fashion.

In FIG. 3, a normal control performed when the vehicle is driven, that is, when the engine 20 is driven is performed until a time point t1. Namely, when the ignition switch 78 is switched from the on state to the off state, the control signal to the T/M ECU 70 is switched from the control operative signal to the control stop signal, which is then transmitted thereto, and the T/M ECU 70, which has received the control stop signal, starts to release the meshing of the synchronizers 60, 62, 64, 66 in the transmission 1.

However, in reality, since a slight time lag is produced from the time at which the ignition switch 78 is switched from the on state to the off state to the time at which the control stop signal is transmitted, a state is shown in FIG. 3 in which the ignition switch 78 is switched from the on state to the off state immediately before the time point t1.

In addition, even in the case of the extremely low temperature state (for example, −15°) existing, understanding that the meshing of the synchronizers 60, 62, 64, 66 is released within the predetermined period of time (for example, several seconds), the T/M ECU 70 ends the control at a time point at which the meshing of the synchronizers 60, 62, 64, 66 is released, that is, a time point t2 in FIG. 3.

In addition, the body system ECU 76 transmits a control stop signal to the engine ECU 72 and the other ECU's 76 at the time point t2 which is after the predetermined period of time (for example, several seconds) which is the predetermined time delay from the time point t1 at which the control stop signal was transmitted to the T/M ECU 70.

When receiving the control stop signal, the engine ECU 72 stops the operation of the engine 20 by stopping the injection of fuel and ends the control. In addition, the other ECU's 76 also end their respective controls when they individually receive the stop control signal.

The body system ECU 74 also ends its control after having transmitted the control stop signal.

In this way, in the dual-clutch type transmission 1 in which the synchronizing mechanisms are made to mesh with the change-speed gears, when the ignition switch is switched off, firstly, the control stop signal is transmitted to the T/M ECU 70, so that the meshing of the synchronizers is released in an ensured fashion, and thereafter, the control stop signals are transmitted to the other ECU's.

By this configuration, when the ignition is off, that is, when the engine is stopped, the synchronizing mechanisms of the dual-clutch type transmission 1 which are left meshing with the change-speed gears can be left released from the meshing in the ensured fashion, whereby the internal resistance in the transmission 1 is reduced so as to reduce friction therein, thereby making it possible to enhance the startability of the engine.

Thus, as has been described heretofore, in the control apparatus of the vehicle according to the invention, in the vehicle provided with the so-called dual-clutch type transmission 1 which has the clutches and groups of gears for the two systems, when the ignition switch 78 is switched off, the body system ECU 74 firstly transmits the control stop signal to the T/M ECU 70 and thereafter transmits the control stop signal to the engine ECU 72 and the other ECU's 76 after the predetermined delay time has elapsed since then.

Since when receiving the control stop signal, the T/M ECU 70 releases the meshing of the synchronizers 60, 62, 64, 66 and thereafter stops its control, the body system ECU 74 transmits the control stop signal to the T/M ECU 70 when the ignition switch 78 has been switched off, whereby firstly, the meshing of the synchronizers 60, 62, 64, 66 of the transmission 1 is released. Then, the control stop signal is transmitted to the engine ECU 72 after the predetermined delay time has elapsed, whereby the engine is stopped.

In this way, when the ignition switch 78 is off, that is, when the engine is stopped, by stopping the engine 20 after the synchronizers 60, 62, 64, 66 of the dual-clutch type transmission 1 which are left meshing with the change-speed gears are released from the meshing, the vehicle can be stopped in such a state that the internal resistance of the transmission 1 is reduced.

By this configuration, load exerted on the engine 20 next time it is started can be reduced, thereby making it possible to enhance the startability of the engine 20. In particular, in the extremely low temperature condition under which the internal resistance of the transmission 1 is increased, an engine starting failure can be prevented.

Thus, the description of the embodiment of the control apparatus of the vehicle according to the invention will be ended, however, the embodiment is not limited to the embodiment that has been described heretofore.

For example, while in the embodiment, the delay time is set to the predetermined period of time (for example, several seconds), the delay time is not limited to the predetermined period of time (for example, several seconds). For example, the delay time may be set according to the outside temperature of the vehicle. For example, the delay time may be set to vary in such a manner that the lower the outside temperature, the longer the delay time, or the higher the outside temperature, the shorter the delay time. By this configuration, not only can the start of the engine be ensured at low temperatures but also the delay time is made shorter at normal temperatures, thereby making it possible to stop the engine 20 more quickly. However, in the event that the delay time becomes too long, since a state is produced in which the engine still remains running for a certain period of time even after the ignition switch 78 has been switched from on to off, and hence, it is preferable to set the delay time to such an extent that the driver does not have to feel a sensation of physical disorder.

In addition, while in the embodiment, the delay time is set to the predetermined period of time (for example, several seconds), instead of setting the predetermined time, a configuration may be adopted in which the T/M ECU 70 is given a function to transmit a synchromesh release signal when it receives the control stop signal to thereby release the meshing of the synchronizers 60, 62, 64, 66, and the body system ECU 74 first transmits the control stop signal to the T/M ECU 70 and thereafter, after detecting the synchromesh release signal from the T/M ECU 70, transmits the control stop signal to the engine ECU 72 and the other ECU's 76.

By adopting this configuration, not only can the engine be stopped by releasing the meshing of the synchronizers 60, 62, 64, 66 in the ensured fashion but also the delay time can be shortened extremely short.

In addition, while in the embodiment, the body system ECU 74 is made to first transmit the control stop signal to only the T/M ECU 70 when the ignition switch 78 becomes off, the engine 20 which drives the hydraulic pump may only have to be kept running at least until the meshing of the synchronizers 60, 62, 64, 66 is released, and provided that this is possible, the control stop signal may also be transmitted to the other ECU's 76 when it is transmitted to the T/M ECU 70.

Additionally, while in the embodiment, the dual-clutch type transmission is described with a view to realizing compatibility with the effect of attaining the change-speed gear more quickly, the invention is not limited to the dual-clutch type transmission but may be applied to a transmission having a clutch and a group of gears for one system or clutches and groups of gears for three or more systems, provided that the transmission has a normally open wet clutch or clutches.

According to the invention, in the vehicle provided with the transmission which has the normally open wet clutches for connecting or disconnecting the drive force from the engine and the groups of gears, when the ignition switch is switched off, the body system ECU first transmits the control stop signal to the T/M ECU and thereafter transmits the stop signal to the engine ECU.

Since when receiving the control stop signal, the T/M ECU releases the meshing of the synchronizers and thereafter stops its control, the body system ECU transmits the control stop signal to the T/M ECU when the ignition switch has been switched off, whereby firstly, the meshing of the synchronizers of the transmission is released. Then, the control stop signal is transmitted to the engine ECU after the meshing of the synchronizers of the transmission has been released, whereby the engine is stopped.

In this way, when the ignition switch is off, that is, when the engine is to be stopped, by stopping the engine after the synchronizers of the transmission which are left meshing with the change-speed gears are released from the meshing, the engine can be stopped in such a state that the internal resistance of the transmission is reduced.

By this configuration, even though a normally open wet clutch is used in which no electric load is exerted on the clutch when the engine is stopped, since the meshing of the synchronizers is released, next time the engine is started, the load exerted on the engine can be reduced even in the event that the shear resistance of oil in the wet clutch or the mechanical resistance of the gears is increased, thereby making it possible to enhance the startability of the engine. In particular, in the extremely low temperature condition under which the internal resistance of the transmission is increased, an engine starting failure can be prevented.

In addition, since the clutches are the normally open clutches, no electric load is exerted on the clutches when the engine is stopped.

According to the invention, since the so-called dual-clutch type transmission which has the clutches and groups of gears for two systems is used, even though the gear shift lever is in the drive force cut-off position while the engine is in operation, since the synchronizers are made to operationally mesh with the change-speed gears, the attainment of a quick change of gear can be realized, while by stopping the engine after the meshing of the synchronizers of the transmission which are left meshing with the change-speed gears when the ignition switch is off, that is, when the engine is stopped is released, the engine can be stopped in such a state that the internal resistance of the transmission is reduced.

By this configuration, the load exerted on the engine next time the engine is started can be reduced, thereby making it possible to enhance the startability of the engine.

According to the invention, the predetermined time from the transmission of the control stop signal to the T/M ECU to the transmission of the control stop signal to the engine ECU is set according to the outside temperature of the vehicle which is related to the time spent releasing the meshing of the synchronizers by the actuator.

By this configuration, the engine can be stopped quickly while releasing the meshing of the synchronizers of the transmission in the ensured fashion.

According to the invention, the T/M ECU is given the function to transmit the synchromesh release signal when it releases the meshing of the synchronizers upon receipt of the control stop signal, and the body system ECU is made to first transmit the control stop signal to the T/M ECU and thereafter transmit the control stop signal to the engine control means after it has detected the synchromesh release signal from the T/M ECU.

By this configuration, not only can the engine be stopped by ensuring the release of meshing of the synchronizers but also the time from the ignition is switched off until the engine is stopped can be shortened as short as possible.

What is claimed is:

1. A control apparatus of a vehicle, comprising:
an internal combustion engine, equipped on the vehicle;
a transmission, including a normally open wet clutch for transmitting or interrupting drive force from the internal combustion engine, and a group of gears which are made to mesh with synchronizing mechanisms for attaining a predetermined change of gear;
a shift lever, which can select through a manual operation thereof a drive force cut-off position where transmission of drive force from the internal combustion engine to drive road wheels is cut off;
an internal combustion engine controller, controlling the internal combustion engine, and stopping the internal combustion engine when receiving a first control stop signal;
a transmission controller, controlling the clutch and the synchronizing mechanisms via an actuator which is actuated by a power source driven by the internal combustion engine, when the shift lever is in the drive force cut-off position, the transmission controller disengaging the clutch and meshing the synchronizing mechanism with the group of gears to attain a predetermined change of gear, the transmission controller ending a control after releasing the meshing of the synchronizing mechanism from the predetermined change of gear when receiving a second control stop signal; and
a control stop signal controller, transmitting the second control stop signal to the transmission controller when detecting that an ignition switch of the vehicle is switched off, and transmitting the first control stop signal to the internal combustion engine controller after a predetermined period of time, which is set according to an outside temperature of the vehicle, has elapsed since the second control stop signal has been transmitted to the transmission controller, the predetermined period of time being a time required for the transmission controller to release the meshing of the synchronizing mechanism of the transmission.

2. The control apparatus of the vehicle as set forth in claim 1, wherein the predetermined period of time is set longer as the outside temperature becomes lower.

3. The control apparatus of the vehicle as set forth in claim 1, wherein
the transmission is a dual-clutch transmission which includes clutches like the clutch and groups of gears like the group of gears for two systems, and the transmission controller disengages the clutch and meshes the synchronizing mechanism with the group of gears to attain the predetermined change of gear when the shift lever is in the drive force cut-off position.

* * * * *